Nov. 1, 1966 V. L. DARBY ETAL 3,282,615
WELDED STRUCTURE AND METHOD OF MAKING SAME
Filed Sept. 17, 1962 2 Sheets-Sheet 1
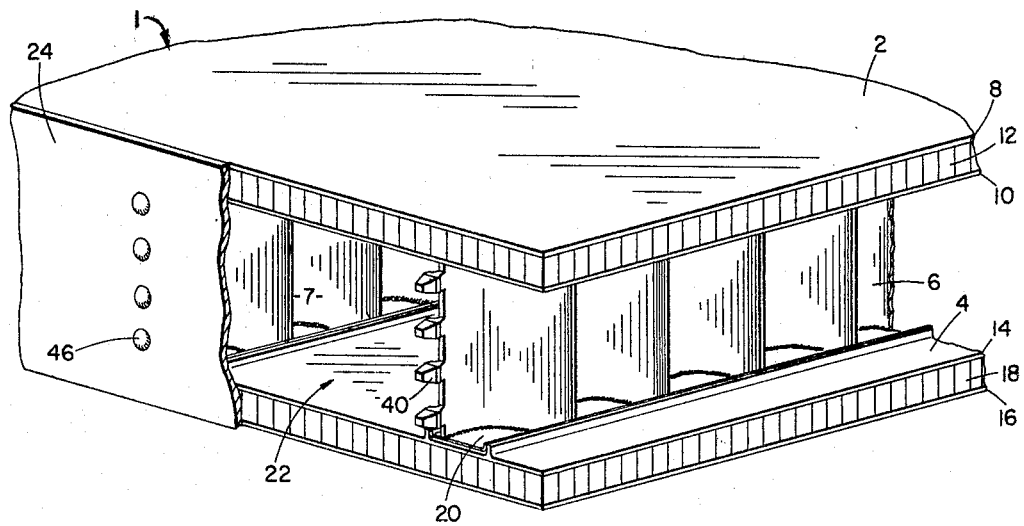
FIG. 1
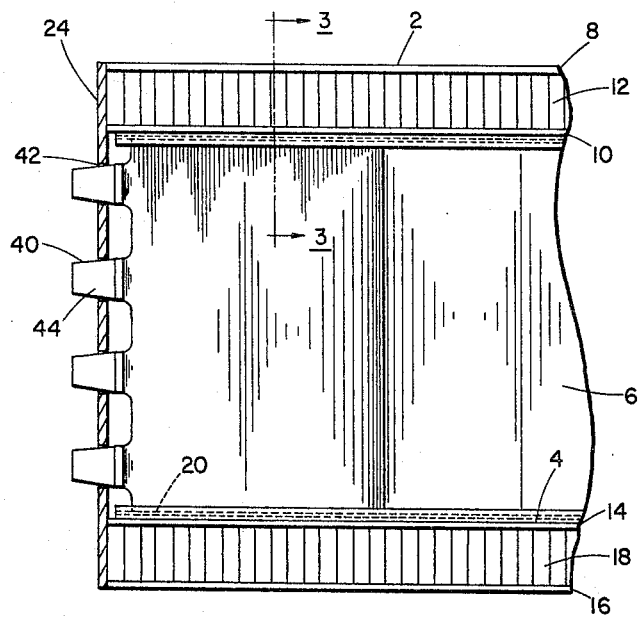
FIG. 2
INVENTORS
VENE L. DARBY
BY EDWIN E. HATTER
ATTORNEY

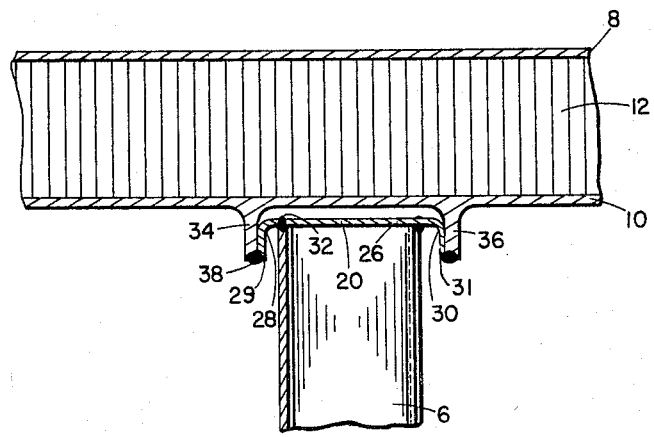
FIG. 3
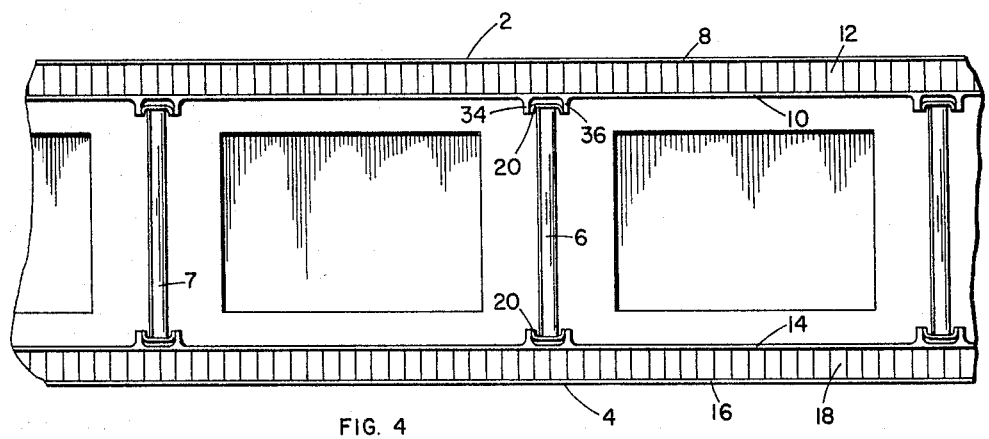
FIG. 4
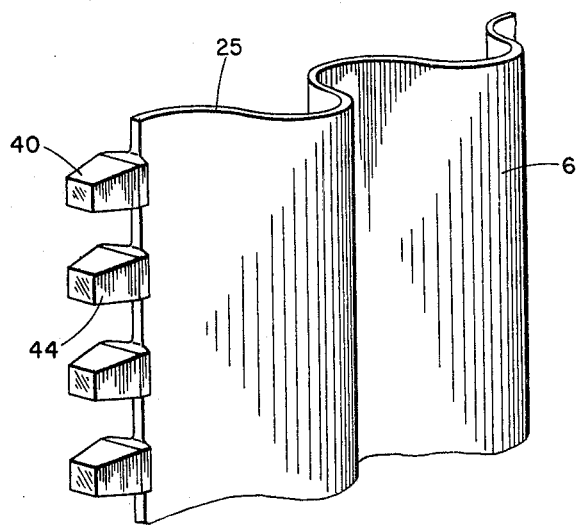
FIG. 5
INVENTORS
VENE L. DARBY
EDWIN E. HATTER
BY
ATTORNEY

United States Patent Office 3,282,615
Patented Nov. 1, 1966

3,282,615
WELDED STRUCTURE AND METHOD OF
MAKING SAME
Vene L. Darby, Redondo Beach, and Edwin E. Hatter, Torrance, Calif., assignors to North American Aviation, Inc.
Filed Sept. 17, 1962, Ser. No. 224,126
23 Claims. (Cl. 287—189.36)

This invention concerns novel attachment structure and method for fabricating articles of diverse shape, especially articles of thin-walled or otherwise heat-sensitive nature wherein such fabrication involves welding. More particularly, the invention contemplates an improved welded connection between workpiece components of box-like final form wherein dimensional change of such components due to application of welding heat must be avoided and/or compensated for during the fabrication process.

While the inventive concept disclosed herein is of wide application, it will be described for the sake of illustration in connection with fabrication of modern supersonic aerial and orbital vehicles in which thin-walled precipitation hardenable stainless steel sheets and sandwich type panels of diverse sizes and shapes are extensively used. It will be understood that the invention is not limited to the precise structural details or methods illustratively shown and described to explain the same, except as determined by reference to the accompanying claims.

Fusion welding of thin gage sheet metal lacking sufficient mass to dissipate welding heat requires special techniques and precautions to avoid the weakening and distorting effects commonly associated with application of concentrated heat to workpieces of thin-walled construction. Sandwich type steel panels of the type mentioned above exhibit a particular sensitivity to welding heat due to their typically brazed construction in addition to the extremely low mass of their component parts. Such panels in general comprise a lightweight cellular core affixed between two face sheets of relatively greater density than the core. Panels of the stated type are extensively used to form external skin surfaces and various internal structural details such as bulkheads, compartments and fuel cells in vehicles of the class mentioned above. The transfer of structural loads into and out of such panels requires particular care in the design of structural connection intended to accomplish load transfer, especially in view of the danger that panel components may separate locally when substantially uniform load distribution throughout the panel is not maintained.

In connection with fabricating supersonic aerial and space vehicles, the welding problem mentioned above is additionally complicated by the use of advanced alloy steels having strength and hardness properties adequate for the extreme temperatures and stresses encountered in vehicle operation. Illustrative of these materials is the alloy commonly designated PH15-7Mo, comprising the following components:

| | |
|---|---|
| Carbon | .09 percent maximum. |
| Manganese | 1.00 percent maximum. |
| Phosphorous | .04 percent maximum. |
| Sulphur | .03 percent maximum. |
| Silicon | 1.00 percent maximum. |
| Chromium | 14.00 to 16.00 percent. |
| Nickel | 6.5 to 7.5 percent. |
| Molybdenum | 2.00 to 3.00 percent. |
| Aluminum | .75 to 1.5 percent. |
| Iron | Balance. |

The stated advanced alloy steels including PH15-7Mo steel are characterized by severe shrinkage during the cooling period after fusion welding of the same, the precise amount of which depends in part upon the material thickness in a given case. Since panels of the type described above often involve honeycomb core material having cell walls on the order of .001 inch thickness brazed to face sheets of .006 inch thickness, for example, and since joinder of panels to related structure in wings or bodies of vehicles in the stated class requires precision joints of great length, dimensional accuracy and material strength are lost where uncontrolled shrinkage results from application of welding heat upon or close to the panels. Also, such heat melts the brazing alloy in the core-to-face sheet joints whereby the panel is weakened or even partially disassembled. Therefore, it is necessary in fabricating compartments, airfoils, or the like involving such panels that avoidance of direct heat application on workpiece components at locations not intended to receive such heat, as well as dimensional correction of workpiece components during assembly thereof, be scrupulously practiced in regard to welded joints which secure such components to connecting structural elements.

Accordingly, it is a principal object in this case to provide improved connection method and means for transferring loads into and out of lightweight panels by structural elements secured thereto.

It is another object in this case to provide an improved welded connection between thin-walled or otherwise heat-sensitive workpiece components whereby the adverse effects of welding heat are avoided in forming such connection.

It is a further object of this invention to provide an improved joint as set forth in these objects for use in joining a spar to panel sections forming skin surfaces in supersonic aerial and orbital vehicles.

It is additionally an object in this case to provide a welded joint arrangement for securing the ends of an internal spar in a box-like structural configuration wherein compensation for dimensional changes of the spar during prior fabrication steps is permitted.

Other objects and advantages of the instant invention will become apparent upon a close reading of the following detailed description of an illustrative embodiment of the inventive concept, reference being had to the accompanying drawings, wherein:

FIGURE 1 shows a general perspective view, partly broken away, of wing internal structure illustratively incorporating the inventive principles taught herein, FIGURE 2 shows an isolated elevational view, partly in cross-section, of the spar and related structure shown in FIGURE 1, FIGURE 3 shows a cross-sectional view taken along line 3—3 of FIGURE 2, FIGURE 4 shows an elevational view of the structure shown in FIGURE 1 seen from the opposite side thereof, and FIGURE 5 shows an isolated perspective view, partly broken away of the spar shown in FIGURES 1 through 4.

Referring to FIGURE 1, it may be seen that the invention in this case, as illustratively applied to wing construction in a modern supersonic aerial or space vehicle, involves joinder of workpiece components characterized by thin gage or otherwise heat-sensitive materials such as stainless steel sheet metal. Thus, a pair of lightweight panels 2 and 4 are shown in spaced relationship as required to form the upper and lower aerodynamic surfaces, respectively, of a wing or airfoil 1, and continuously maintained in the stated relationship by suitable internal supports such as a plurality of spars as indicated by reference numerals 6 and 7 in FIGURE 1. Although spars 6 and 7 are illustratively shown as formed from sheet metal, it will be understood that the inventive principles taught herein are equally applicable when spars 6 and 7 are of panel form such as panels 2 and 4. Upper lightweight panel 2 comprises a pair of face sheets 8 and 10 affixed to a low density core 12 which may comprise honeycomb material of thin-foil construction. Lower lightweight panel 4 is similar to upper panel 2 and comprises face sheets 14 and 16 joined to core 18. Due to the highly destructive effects which would follow from application of welding heat upon heat sensitive workpiece components of generally platelike form such as spars 6 and 7 and panels 2 and 4 to join the same in substantially perpendicular overall relationship, the arrangement of intermediate parts connecting the upper and lower edges of internal braces such as spars 6 and 7 with panels 2 and 4 comprise an important feature of the invention in this case.

From FIGURE 1, it may be seen that spar 6 may be of sinusoidal or undulating form and that its peripheral lower edge is joined to an elongated cap or channel-like member 20 which may be integrally formed wtih spar 6 or may be affixed to spar 6 in various ways including that described below. It will be understood that spar 6 may be any member of web-like form, elongate in cross-section and having a height greater than its thickness, whether straight, corrugated or sinusoidal in form, and that its initial length may be of any desired amount without consequence insofar as the inventive principles taught herein are concerned. Cap member 20 is joined to panel 4 as seen in greater detail from FIGURE 3 discussed below. The upper peripheral edge 25 of spar 6 shown in FIGURE 5 is structurally related to panel 2 in a manner identical to the connection between panel 4 and the lower spar edge. Spars 6 and 7 with upper and lower panels 2 and 4 may cooperatively form a hollow box or cell-like structure defining a cavity or cell-like opening as indicated generally by reference numeral 22. End closure means for cell or cavity 22 are formed by panel or bulkhead 24 which may take the form of a sheet metal element of unitary construction as shown in FIGURES 1 and 2, for example.

Referring to FIGURE 3, it may be seen that elongate cap or channel 20 comprises a substantially planar transverse floor or base portion 26 and a pair of upturned flange or side portions 28 and 30 on either side of base portion 26 which may be substantially continuous and coextensive therewith. Side portions 28 and 30 have distal edges 29 and 31 which may be coplanar with respect to each other and parallel with base portion 26. In assembling the structure shown by FIGURES 1–4, each of the spars such as spar 6 is first joined in edge-wise or simulated T cross-sectional relationship to one surface of a floor or base portion 26 on a channel 20 at the upper and lower edges of each spar by suitable means such as the progressive burn-through welding method taught in U.S. Patent 3,012,130, issued December 5, 1961, to J. R. Harrison, although the invention in this case is not limited to any particular method of joinder between spar 6 and channel 20. Weld bead 32 in FIGURE 3 is illustrative of a weld formed by the method which is taught in U.S. Patent 3,012,130 and which is preferred in the embodiment disclosed herein.

It will be understood that the surface of base portion 26 to which the edge of spar 6 is attached has a contour oppositely corresponding to the contour of the stated edge whereby the edge may be in substantially continuous contact with the stated surface, and that neither such element need be planar as in the case when panel 2, for example, is of compound curvature or otherwise non-planar. Also, where spar 6 is of lightweight panel form such as panel 2, burn-through welding to join cap 20 to each of the face sheets on such panel to the cap may be accomplished in the same manner disclosed by aforementioned U.S. Patent 3,012,130.

Flange or edge portions 28 and 30 on intermediate cap member 20 are adapted for structural connection with projection means which may be integrally formed or otherwise secured to the surface forming the remaining structure of the workpiece, such as the face sheets of panels 2 and 4. Thus, as illustrated by FIGURE 4, the two inwardly confronting face sheets 10 and 14 of panels 2 and 4, respectively, are each provided with substantially parallel projecting means in the form of upstanding flanges or ridges 34 and 36, for example, properly spaced and in substantial vertical alignment as required to receive channels 20 at the upper and lower edges of each adjoining spar when the stated components are assembled in desired final relationship. Following placement of each spar, with channel member 20 attached thereto, in the general relationship shown by FIGURE 4, for example, whereby the distal edges of each cap member are substantially coplanar with the distal edges of the ridge contacted by each of the stated cap edges, welding may begin. Thus, welding heat is applied simultaneously to the coextensively contacting and substantially coplanar distal edges of ridge 34 and flange portion 28 progressively along a path generally defined by the line of contact therebetween, whereby the material in the stated distal edges is burned down and forms weld bead 38 fusing together the edges as shown in FIGURE 3. Welding is similarly accomplished to join each of the flanges on each channel member 20 with the ridges proximately contacting the stated flanges.

Due to the fact that inner bracing and other structural members such as spars 6 and 7 and channel members 20 in aerial vehicle components such as airfoil 1 illustratively shown and described herein may be of considerable length, and are thin gage material of the type which is subject to shrinkage after welding thereof, progressive welding along a plurality of paths in the manner described above has been found to produce a reduction in overall length of the spar and/or channel. Thus, for example, welding along the four seams as required for joinder of upper and lower channel members 20 on either side thereof, produces a small amount of shrinkage in each increment of length and height having a cumulative effect on the final overall dimensions of the spar. As a result, assembly of the spar by welding in the manner discussed above in connection with weld bead 38 alters the location of the spar terminal end where it is required to join related structure such as end closure member 24 shown in FIGURES 1 and 2.

Accordingly, means are incorporated in the novel structure taught herein to compensate for changes in length of spar 6, for example, to permit positive and secure joinder of the spar terminal end to related structure. Thus, referring to FIGURE 1, it may be seen that spar 6 terminates at the end thereof closest to member 24 in a plurality of tapered bosses or projections 40 having substantially uniform size and shape. Bosses 40, shown in greater detail in FIGURES 2 and 5, may be separately fabricated and joined to spar 6 by appropriate means, or may be integrally formed therewith. Projecting bosses 40 are sized and located with respect to a plurality of holes 42 formed in end closure member 24 whereby the bosses enter such holes when member 24 is placed in desired final relationship with respect to the remaining structure as shown in FIGURE 1. Thus, it may be seen from FIGURE 2, for example, that projecting bosses 40 on the terminal end of spar 6 are structurally related with member 24 whereby the projections protrude outwardly beyond holes 42 when the workpiece components are assembled. It will be understood that dimensional changes such as reduction in the length of spar 6 due to shrinkage therein will result in partial withdrawal of bosses 40 from holes 42 in an amount depending upon the location or severity of the stated shrinkage. As noted hereinabove, such dimensional changes result from assembly of spar 6 with channels 20 and especially after completion of the joint between channels 20 and panels 2 and 4 in the relationship shown, for example, by FIGURES 3 and 4. Projections 40 are provided with a length and degree of taper sufficient to substantially fill holes 42 and to project ontwardly therefrom even when maximum possible shrinkage occurs in spar 6.

When assembly of the workpiece components discussed above is complete except for closure member 24, the stated member is placed in desired final relationship with the remaining structure as shown in FIGURES 1 and 2. Thereafter, member 24 is fused to the other workpiece components by application of welding heat to join the material therein to panels 2 and 4 and to spar 6. With member 24 in the position shown by FIGURE 2, joinder of the same to spar 6 is accomplished by application of welding heat to the distal end 44 of each projecting boss 40 whereby the projections are burned down so that the material therein completely fills holes 42 and fuses with the material in member 24 as indicated by reference numeral 46 in FIGURE 1, for example.

Following joinder of closure member 24 to the other workpiece components by appropriate welding at the upper and lower edges thereof as well as burn down welding of bosses 40, it will be understood that complete sealing of cell or cavity 22 across member 24 will result. Thus, where the structure shown by FIGURE 1 involves formation of fuel cells within airfoil 1 so that fuel is contained exteriorly of cavity 22, the fusion of material in bosses 40 with member 24 forms a completely fluid tight joint having the requisite strength for transfer of loads between the stated structural components.

From the disclosure set forth above and shown in the drawings, it may be seen that the invention disclosed herein provides improved welded connection between web-like members such as spar 6 and surfaces which may be of any thickness or form. However, the invention is particularly applicable to workpieces of thin-walled or otherwise heat-sensitive nature such as thin metallic spars or braces joined to lightweight panels of sandwich-type construction. The teachings set forth herein, as applied to airfoils or other workpieces involving box-like final form such as shown in FIGURE 1, may be seen to avoid distortion of lightweight panels 2 and 4 during joinder of spar 6 therewith. Thus, weld bead 38 illustratively shown in FIGURE 3 is both relatively distant from face sheet 10 and spaced apart from spar 6, as a result of which distortion, annealing, degradation of panel strength or other deleterious heating effects are avoided. Moreover, the burn-down weld method as applied to fusion of flange portions 28 and 30 with ridges 34 and 36, for example, in FIGURE 3 produces a structural connection of superior strength and reliability for transfer of loads between spar 6 and panels 2 and 4. In addition, use of bosses or projections 40 at the terminal end of spar 6 allows for dimensional change in spar length during assembly thereof with panels 2 and 4 while permitting strong and fluid tight joints between the spar and end closure members such as member 24 shown in FIGURES 1 and 2.

While the particular details set forth above and in the drawings are fully capable of attaining the objects and providing the advantages herein stated, the structure thus disclosed is merely illustrative and could be varied or modified to produce the same results without departing from the scope of the inventive concept as defined in the appended claims.

We claim:

1. Structural connection means between two workpiece portions of generally plate-like form arranged substantially in perpendicular relationship, comprising:
   at least one flange on one of said workpiece portions, said flange having a first distal edge,
   at least one flange on the other of said workpiece portions, said last stated flange having a second distal edge, spaced from said other portion,
   said first and second distal edges being in substantially continuous coplanar alignment and said flanges being in substantially continuous coextensive surface contact when said two workpiece portions are arranged in said substantially perpendicular relationship, and
   a welded connection across said first and second distal edges joining said flanges together to secure said two workpiece portions permanently in said substantially perpendicular relationship.

2. The structure set forth in claim 1 above, wherein:
   said one workpiece portion comprises a web-like member integrally formed with transverse cap means along a peripheral edge of said web-like member, said cap means having said flange on said one workpiece portion extending therefrom.

3. The structure set forth in claim 1 above, wherein:
   said one workpiece portion comprises a web-like member secured to transverse cap means along a peripheral edge of said web-like member by at least one weld joint, said cap means having said flange on said one workpiece portion extending therefrom.

4. The structure set forth in claim 3 above, wherein:
   said other workpiece portion comprises a surface upon which said flange having said second distal edge is mounted in upstanding relationship.

5. The structure set forth in claim 3 above, wherein:
   said cap means is welded to said web-like member substantially in simulated T cross-sectional relationship.

6. The structure set forth in claim 5 above, wherein:
   said other workpiece portion comprises a surface upon which said flange having said second distal edge is mounted in upstanding relationship and substantially normal to said surface.

7. The structure set forth in claim 6 above, wherein:
   said other workpiece portion consists of a lightweight panel having a relatively low density core with a face sheet affixed to each side of said core, and
   said flange having said second distal edge mounted on an external surface of one of said face sheets.

8. The structure set forth in claim 7 above, wherein:
   said cap means comprises an elongate channel having a substantially flat base portion joined on at least one side thereof by said flange having said first distal edge.

9. In a structural connection between a web-like first member and a surface:
   cap means welded to a peripheral edge of said web-like first member substantially in simulated T-cross-sectional relationship,
   said cap means including at least one flange thereon, said flange having a first distal edge,
   upstanding flange means on said surface, said flange means including at least one flange having a second distal edge spaced from said cap means, and
   a welded connection across said first and second distal edges joining together in fixed relationship said web-like first member and said surface.

10. The structure set forth in claim 9 above, wherein:
    said web-like first member comprises a relatively thin elongate sheet metal member,
    said cap means comprises an elongate channel of general U-shaped cross-sectional form having a substantially flat base portion joined in substantially perpendicular relationship to a flange on each side of said base portion, one of said flanges adjoining said base portion consisting of said flange having said first distal edge, and
    said peripheral edge of said sheet metal member being welded to said base portion of said channel between said flanges adjoining said base portion.

11. The structure set forth in claim 10 above, wherein:
    said upstanding flange means on said surface comprises at least one pair of substantially parallel ridges extending from said surface in substantially perpendicular relationship therewith, one of said ridges consisting of said one flange having said second distal edge.
    the other of said ridges consisting of another flange having a third distal edge and substantially identical to said one flange having said second distal edge, said second and third distal edges being substantially coplanar and coextensive, said elongate channel closely fitting between said pair of ridges with said flanges on said elongate channel in substantially continuous bearing contact with said ridges, and said welded connection joining said flanges on said elongate channel with said ridges on said surface across said distal edges respectively formed thereon.

12. In lightweight aerodynamic structure, connection means between an elongate metal spar and a skin panel surface arranged in substantially perpendicular relationship to said spar, comprising:

at least one flange affixed on said spar proximate an elongate peripheral edge thereof, said flange having a first distal edge, at least one flange on said panel surface, said last stated flange having a second distal edge spaced from said spar, said first and second distal edges being in substantially continuous coplanar alignment and said flanges being in substantially continuous coextensive surface contact when said spar and said skin surface are arranged in said substantially perpendicular relationship, and a welded connection across said first and second distal edges joining said flanges together.

13. In lightweight structure of metallic thin-walled construction, connection means between a first member of generally plate-like form and a second member of generally plate-like form arranged substantially normal to said first member, connection means comprising:

an elongate channel of generally U-shaped cross-sectional form having a substantially flat base portion adjoined on each side by a flange, said flanges having substantially parallel and coplanar distal edges, said first member having a peripheral edge thereof secured to said base portion of said channel between said flanges adjoining said base portion, said second member having a pair of spaced-apart upstanding flanges, said flanges having substantially parallel and coplanar distal edges, said channel closely fitting between said spaced-apart upstanding flanges with said distal edges on said flanges on said channel each being substantially in close and continuous coplanar juxtaposition with one of said distal edges on said spaced-apart upstanding flanges on said second member when said first and second members are arranged in said substantially normal relationship, and a welded connection across said juxtaposed distal edges securing each of said upstanding flanges on said second member to one of said flanges on said elongate channel.

14. The structure set forth in claim 13 above, wherein: said second member comprises a panel member having a relatively low-density core sandwiched between two face sheets and secured thereto, said spaced-apart upstanding flanges being mounted on a surface of one of said face sheets opposite the side thereof contacted by said core.

15. The structure set forth in claim 14 above, wherein: said first member comprises a sheet metal member of substantially sinusoidal horizontal crrross-sectional form.

16. The structure set forth in claim 14 above, wherein: said first member comprises a panel member having a relatively low-density core sandwiched between two face sheets.

17. Attachment means securing a web-like first member of elongate cross-sectional form having relatively greater height than thickness to a surface, said means comprising:

a second member of channel-like form having a substantially planar base portion and a plurality of elongate spaced-apart upturned side portions adjoining said base portion, said side portions being substantially normal to said base portion and having continuous distal edges, a welded joint securing said web-like first member to said base portion with the long axis of said cross-section of said first member substantially normal to said base portion, a plurality of spaced-apart elongate ridges projecting outwardly from said surface and arranged so that each of said ridges is in substantially uniform contact with one of said side portions, said ridges having continuous distal edges coextensive and coplanar with said distal edges on said side portions when said base portion is in close juxtaposition with said surface, and a welded connection between said distal edges on said ridges and said side portions fusing the same together.

18. In a structural assemblage comprising an elongate web-like first member joined to second and third members of plate-like form, said first member having a first peripheral edge extending substantially throughout its length and a second peripheral edge at a terminal end of said first member, the combination of:

cap means including a cap member joined to said first peripheral edge of said first member substantially in simulated T cross-sectional relationship, said cap including at least one flange thereon, said flange having a first distal edge, upstanding flange means on a surface of said plate-like second member, said flange means including at least one flange having a second distal edge arranged in close juxtaposition with said first distal edge, a welded connection across said first and second distal edges fusing the same together, boss means extending from said terminal end of said first member, said boss means including at least one projecting boss having a distal end, aperture means in said plate-like third member including at least one aperture into which said boss extends when said first, second and third members are assembled in operative relationship after said weld connection across said first and second distal edges is completed, and a fusion weld joint uniting said distal end of said boss with said third member.

19. The method of joining together two workpiece portions of generally plate-like form arranged substantially in perpendicular relationship, comprising the steps of:

joining one of said workpiece portions along a peripheral edge thereof to a cap member substantially in simulated T cross-sectional relationship, said cap member having at least one flange with a first distal edge thereon, providing the other of said two workpiece portions with at least one upstanding flange having a second distal edge arranged for substantially continuous coplanar alignment in close juxtaposition with said first distal edge when both said workpiece portions are in said substantially perpendicular relationship, and applying welding heat to said first and second distal edges to burn down said juxtaposed flanges simultaneously fusing the same together.

20. The method of joining together a relatively thin elongate web-like first member and a plate-like second member having a pair of spaced-apart upstanding flange-like ridges, comprising the steps of:

securing a peripheral edge of said first member to an elongate channel of substantially U-shaped cross-section having a substantially flat base portion and an adjoining flange portion on each side of said base portion, said peripheral edge being joined in endwise relationship to said base portion between said flange portions, positioning said channel between said spaced-apart upstanding flange-like ridges with said first member in desired final relationship with respect to said second member and said flange portions in substantially continuous contact with said spaced-apart ridges, and simultaneously burning down said flange portions and contacting ridges to fuse together the material therein.

21. The method of forming a welded structure of relatively thin-walled heat-sensitive construction including an elongate thin sheet metal spar and a lightweight panel of sandwich type construction having a relatively low density core affixed to a face sheet on either side of said core, one of said face sheets having at least one pair of spaced-apart upstanding contacting flange-like ridges extending outwardly therefrom, said method comprising:

a peripheral edge of said spar with an elongate channel of substantially U-shaped cross-section having a substantially flat base portion with an adjoining flange on either side of said base portion, said channel being arranged so that said peripheral edge of said spar is in substantially continuous perpendicular contact with said base portion between said flanges, applying welding heat to said base portion to the surface thereof opposite that contacted by said peripheral edge to fuse said edge to said base portion by burn-through welding, positioning said channel with said spar attached thereto between said spaced-apart upstanding flange-like ridges with said spar in desired final relationship with respect to said panel and said flanges on said channel in substantially continuous contact with said spaced-apart ridges, and simultaneously burning down said flanges and said contacting ridges to fuse together the same.

22. The method set forth in claim 21 above, including in addition thereto:

providing a terminal end of said elongate spar with at least one projecting boss having a distal end, arranging a plate-like member having at least one aperture therethrough in desired final relationship for attachment to said terminal end of said spar, said boss having sufficient length to extend into said aperture after shrinkage of said spar as a result of said burn-down welding, and applying welding heat to said distal end of said boss to deform the same and fuse said boss to said plate-like member.

23. The method set forth in claim 21 above, including in addition thereto:

providing a plurality of spaced-apart projecting bosses on a terminal end of said elongate spar, arranging a member having a plurality of spaced-apart apertures therein in desired final relationship with respect to said spar whereby said bosses extend into said apertures, and applying welding heat to said bosses and fusing the material therein to said member to permanently join said spar terminal end thereto.

References Cited by the Examiner

UNITED STATES PATENTS

| | | | |
|---|---|---|---|
| 1,741,188 | 12/1929 | Goodwin et al. | 105—415 |
| 2,108,795 | 2/1938 | Budd | 219—107 |
| 3,072,225 | 1/1963 | Cremer et al. | 29—191.4 |

FOREIGN PATENTS 28,926    3/1931    Australia.

RICHARD W. COOKE, JR., *Primary Examiner.*

FRANK L. ABBOTT, *Examiner.*

J. LISTER, R. S. VERMUT, *Assistant Examiners.*